(12) United States Patent
Edlou et al.

(10) Patent No.: US 6,824,654 B2
(45) Date of Patent: Nov. 30, 2004

(54) METHOD OF MAKING A CUBE

(75) Inventors: Samad M. Edlou, Carlsbad, CA (US); David H. Peterson, Milford, CT (US)

(73) Assignee: ASML Holding N.V. (NL)

( * ) Notice: Subject to any disclaimer, the term of this patent is extended or adjusted under 35 U.S.C. 154(b) by 0 days.

(21) Appl. No.: 10/260,308

(22) Filed: Oct. 1, 2002

(65) Prior Publication Data

US 2004/0061116 A1 Apr. 1, 2004

(51) Int. Cl.[7] ............................................. C23C 14/34
(52) U.S. Cl. ........................ 204/192.23; 204/192.11; 204/192.12; 204/192.26; 427/248.1; 427/162; 427/331; 427/402
(58) Field of Search ................. 204/192.12, 192.11, 204/192.23, 192.26; 427/162, 331, 248.1, 402

(56) References Cited

U.S. PATENT DOCUMENTS

| | | | |
|---|---|---|---|
| 3,559,090 A | 1/1971 | Refermant et al. | 350/164 |
| 3,704,934 A | 12/1972 | Holmes et al. | 350/152 |
| 4,733,926 A | 3/1988 | Title | 350/1.1 |
| 5,339,441 A | 8/1994 | Kardos et al. | 359/352 |
| 5,400,179 A | 3/1995 | Ito | 359/588 |
| 5,579,159 A * | 11/1996 | Ito | 359/487 |
| 2003/0052275 A1 * | 3/2003 | Berger | 250/372 |

FOREIGN PATENT DOCUMENTS

| | | | |
|---|---|---|---|
| DE | 1 203 978 B | 10/1965 | G01J/42/21 |
| JP | 60064304 | 4/1985 | G02B/5/30 |
| WO | WO 01/63342 A1 | 8/2001 | G02B/27/28 |

OTHER PUBLICATIONS

Copy of European Search Report 03 02 2272 dated Feb. 5, 2004.
Copy of Austrian Search Report dated May 14, 2004.

* cited by examiner

Primary Examiner—Steven Versteeg
(74) Attorney, Agent, or Firm—Sterne, Kessler, Goldstein & Fox, P.L.L.C.

(57) ABSTRACT

A cube used to perform optical functions in a system, such as beam splitting or polarizing, or both, is manufactured by optically contacting a coated prism with an uncoated prism. The coated prism includes a dielectric stack having alternating layers of high and low index of refraction materials. To ensure secure optical contacting between the coated prism and uncoated prism, low interface reflection, and good throughput, a contacting layer is deposited on the dielectric stack. The contacting layer can be fused silica or $SiO_2$, which has natural compatibility with the $CaF_2$ materials that make up the uncoated prism and the coating layers.

8 Claims, 7 Drawing Sheets

METHOD OF MAKING A CUBE

BACKGROUND OF THE INVENTION

1. Field of the Invention

The present invention relates to a cube and method of making same.

2. Background Art

Generally, to make a polarizing cube or a beam splitting cube a prism with a coating (e.g., a dielectric stack) is optically contacted (e.g., bonded) to an uncoated prism. Many parameters must be taken into consideration when optically contacting the prisms to ensure they remain bonded and that they have a certain amount of optical compatibility. Being compatible ensures the lowest amount of reflection occurs when light travels between the bonded surfaces. Problems with adherence and reflection are more common with cubes manufactured for systems using shorter wavelengths of light (e.g., vacuum ultra violet (VUV) and deep ultra violet (DUV) light). In the case of cubes used in VUV and DUV systems, the materials available to manufacture the cubes are very limited for performance reasons, and are typically not conductive to optical contacting. To compound the problem, there are strict environmental parameters that must be maintained for DUV applications that are contrary to current contacting techniques. To overcome these problems, different types of contacting processes have been developed. However, these processes have produced other problems, such as low throughput that can dramatically reduce the effectiveness of the system. For example, in a lithography system the output light is too weak to write patterns on a substrate.

Therefore, what is needed is a process of making a cube that can be used with any wavelength of light in which the bonded prisms are securely optically contacted and optically compatible, which substantially eliminates any reflectivity between bonded surfaces and increases throughput of light in a system using the cube.

BRIEF SUMMARY OF THE INVENTION

An embodiment of the present invention provides a method of making a cube. The method includes the steps of performing a multi-layer coating process to form a multi-layer coating on a prism, performing a contact layer coating process to form a contact layer coating on top of the multi-layer coating, and coupling the prism to an uncoated prism. The contacting layer coating process includes the step of forming a silicon dioxide ($SiO_2$) or fused silica layer as the contact layer.

Another embodiment of the present invention provides a cube including an uncoated prism and a coated prism coupled to the uncoated prism. The coated prism includes a first coating section having a multi-layered coating and a second coating section formed on top of the first coating section. The second coating section has a contact layer coating, which can be a $SiO_2$ or fused silica coating.

advantage of the cube made by the process according to embodiments of the present invention is that it allows for secure bonding between an uncoated and coated prism though use of the contact layer, while still providing high throughput and low reflection between bonded surfaces.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
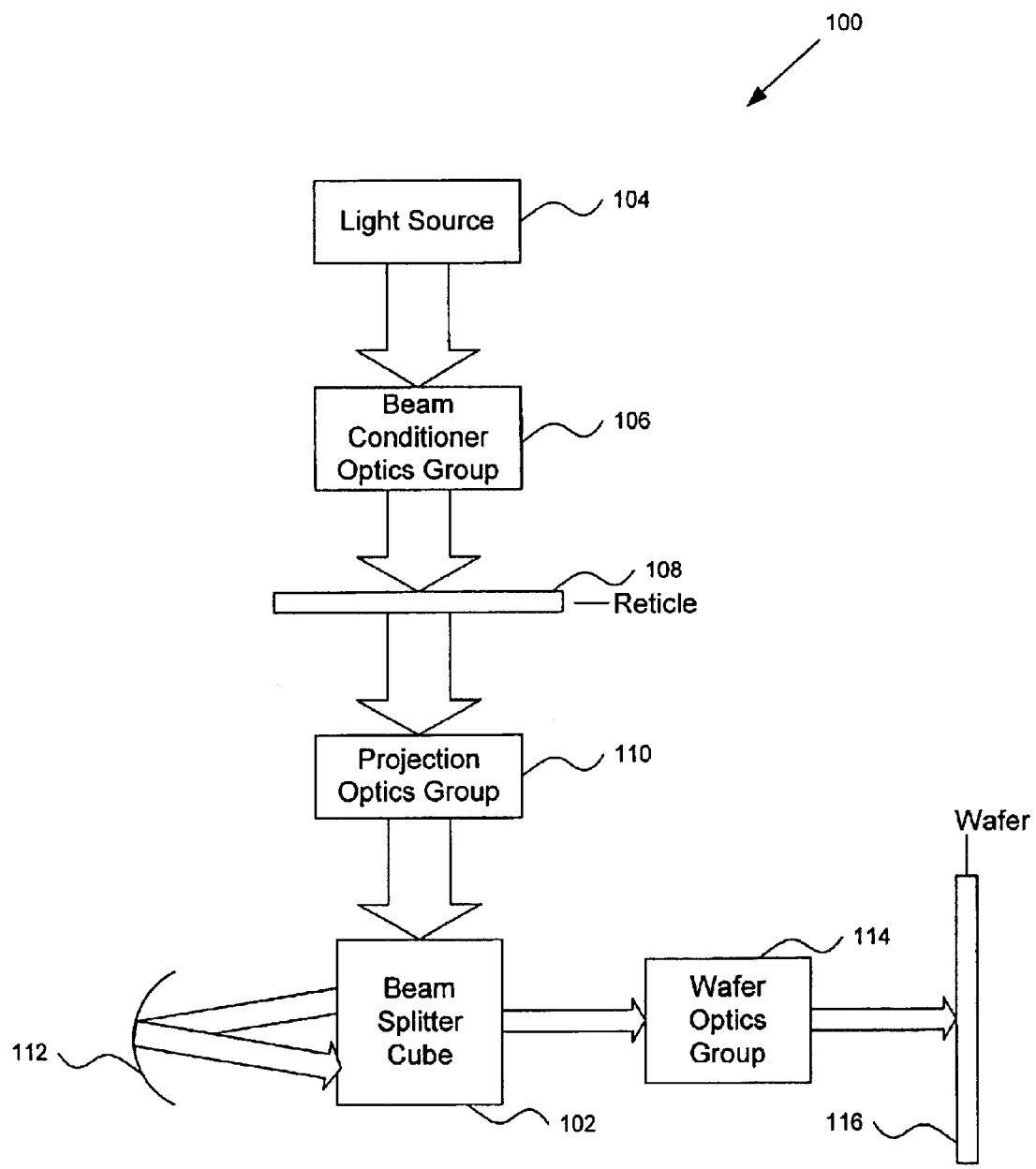
FIG. 1 shows an exemplary environment in which a cube according to embodiments of the present invention is used.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Embodiments of the present invention provide a cube used to perform optical functions in a system, such as beam splitting or polarizing, or both, that is manufactured by optically contacting a coated prism with an uncoated prism. The coated prism includes a dielectric stack having alternating layers of high and low index of refraction materials. To ensure secure optical contacting between the coated prism and uncoated prism, low interface reflection, and good throughput, a contacting layer is deposited on the dielectric stack. The contacting layer can be fused silica or silicon dioxide ($SiO_2$), which have natural compatibility with the calcium fluoride ($CaF_2$) materials that make up the uncoated prism.

A system 100 utilizing a cube 102 manufactured according to embodiments of the present invention is shown in FIG. 1. The system 100 includes a laser 104 that emits light through a beam conditioner 106, a reticle 108, and projection optics 110. After passing through the projection optics 110, the light is reflected by a portion of the cube 102 towards a reflector 112. The reflector 112 reflects the light back through the cube 102 and through wafer group optics 114 onto a wafer 116 to write a pattern on the wafer 116. Although shown in a lithography environment, any system requiring the cube 102 to perform various optical functions (e.g., polarization, beam splitting, etc.) falls within the scope of the embodiments of the present invention.

Figure 2:
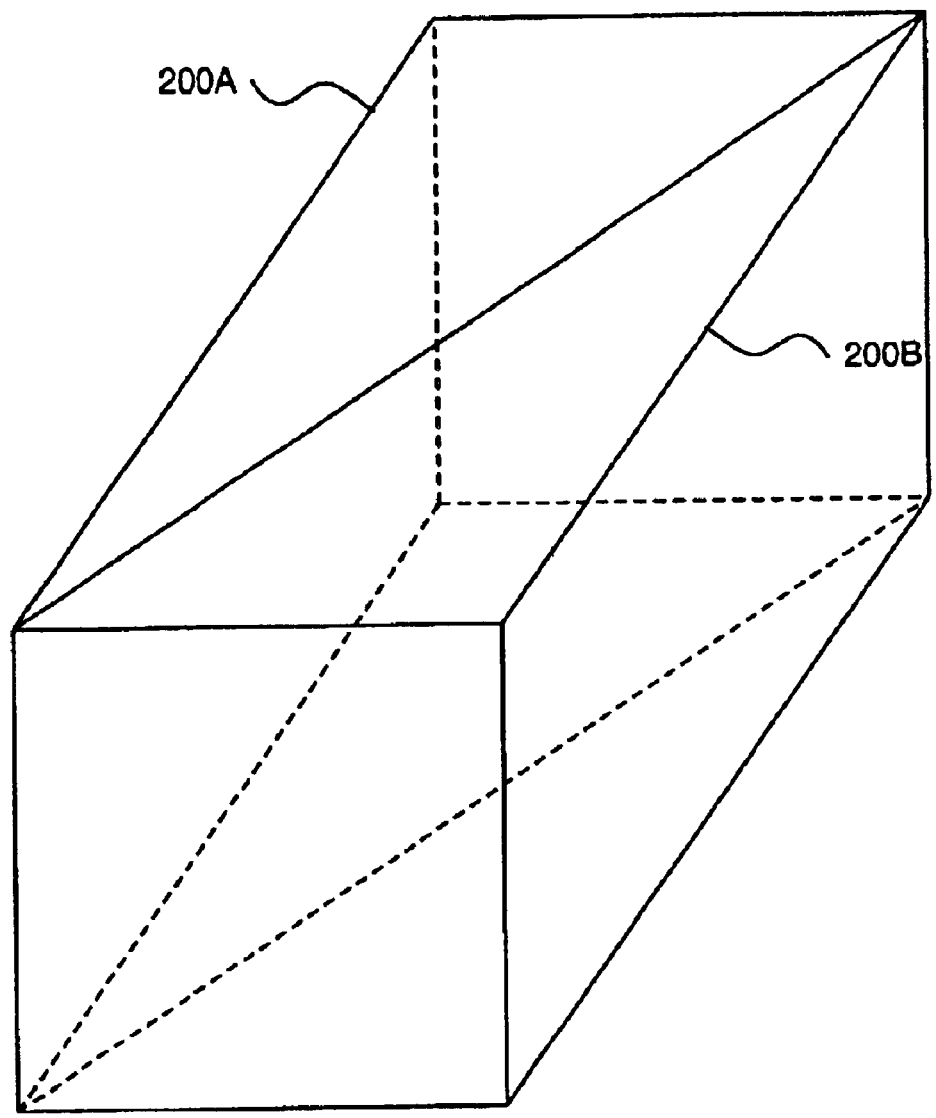
FIG. 2 shows a perspective view of an exemplary cube formed by two prisms according to embodiments of the present invention.
Figure 3:
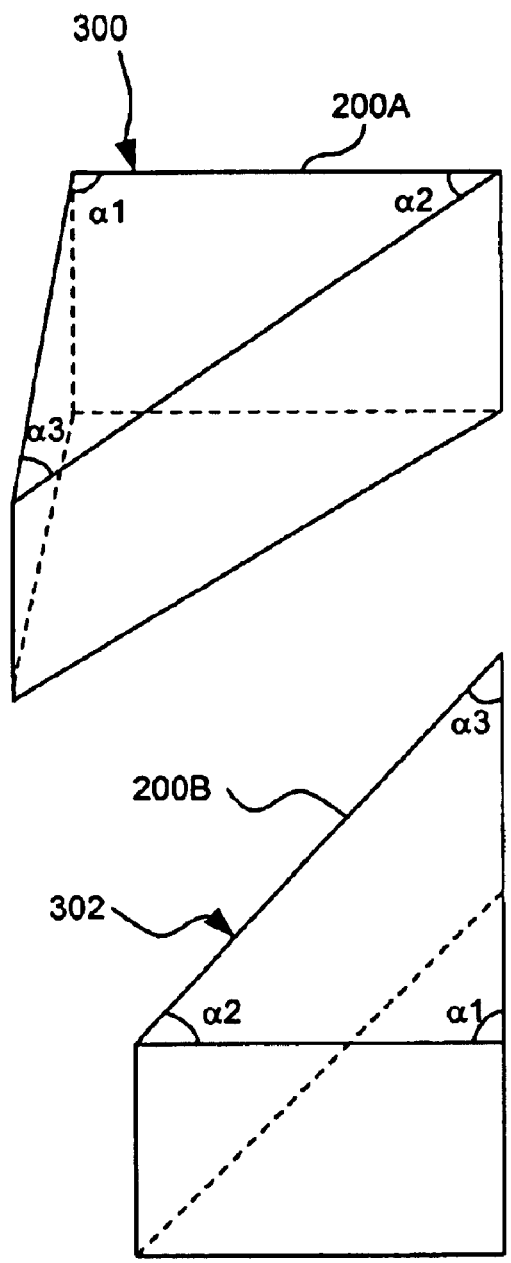
FIG. 3 is an exploded view showing the two prisms used to form the cube of FIG. 2.

As seen in FIGS. 2–3, the cube 102 is formed by coupling a coated optical element 200A to an uncoated optical element 200B according to an embodiment of the present invention. As best illustrated in FIG. 3, a surface 300 of prism 200A and a surface 302 of prism 200B are coupled together during an optical contacting process, which is discussed in more detail below. It is to be appreciated that in some embodiments optical element 200A can be uncoated and optical element 200B can be coated. In an embodiment, the optical elements 200 are prisms made from $CaF_2$ with similar dimensions, although other embodiments utilize prisms 200 of different dimensions and compositions. In one embodiment, the prisms 200 have about $\alpha 1=\alpha 2=45°$ and $\alpha 3=90°$, while in another embodiment the prisms 200 have about $\alpha 1=\alpha 2=52°$ and $\alpha 3=76°$.

Figure 4:
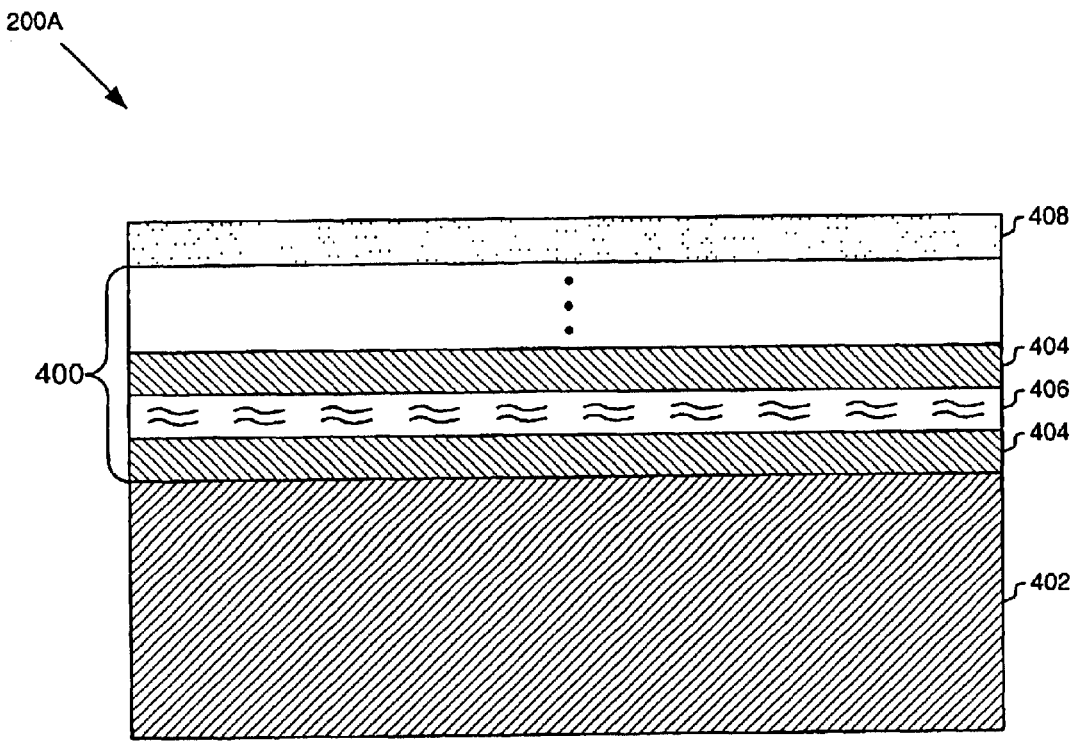
FIG. 4 is a cross-section of a portion of one of the two prisms in FIGS. 2–3.

As seen in FIG. 4, one of the prisms 200A has a dielectric stack 400 deposited onto a main body 402 of the prism 200A. The dielectric stack 400 includes multiple and alternating layers of high 404 and low 406 index of refraction materials. These layers 404 and 406 are deposited onto the main body 402 of the prism 200 during a multi-layer coating process 604, discussed in more detail below. The dielectric stack 400 can contain a plurality (e.g., 20–50) of layers having with each layer being 500 mm—2 micron thick, depending on the environment in which the cube 102 is used. In some embodiments utilizing light having a wavelength of 157 nm, the high index of refraction material is gadolinium fluoride ($GdF_3$) or lanthium fluoride ($LaF_3$) and the low index of refraction material is magnesium fluoride ($MgF_3$). In other embodiments utilizing light having a wavelength of 193 nm, the high index of refraction material is neodymium fluoride ($NdF_3$) and the low index of refraction material is aluminum fluoride ($AlF_3$). In alternative embodiments, other materials with the same properties as those described above can be used.

With continuing reference to FIG. 4, a contact layer 408 is deposited on top of the dielectric stack 400 during a contact layer depositing process 606, discussed in more detail below. The contact layer 408 can be a fused silica or $SiO_2$ layer. The contact layer 408 is a naturally compatible material with the $CaF_2$ material of the uncoated prism 200B. This allows for secure glass-to-glass bonding between the two prisms 200, while ensuring there is little to no interface reflection.

Figure 5:
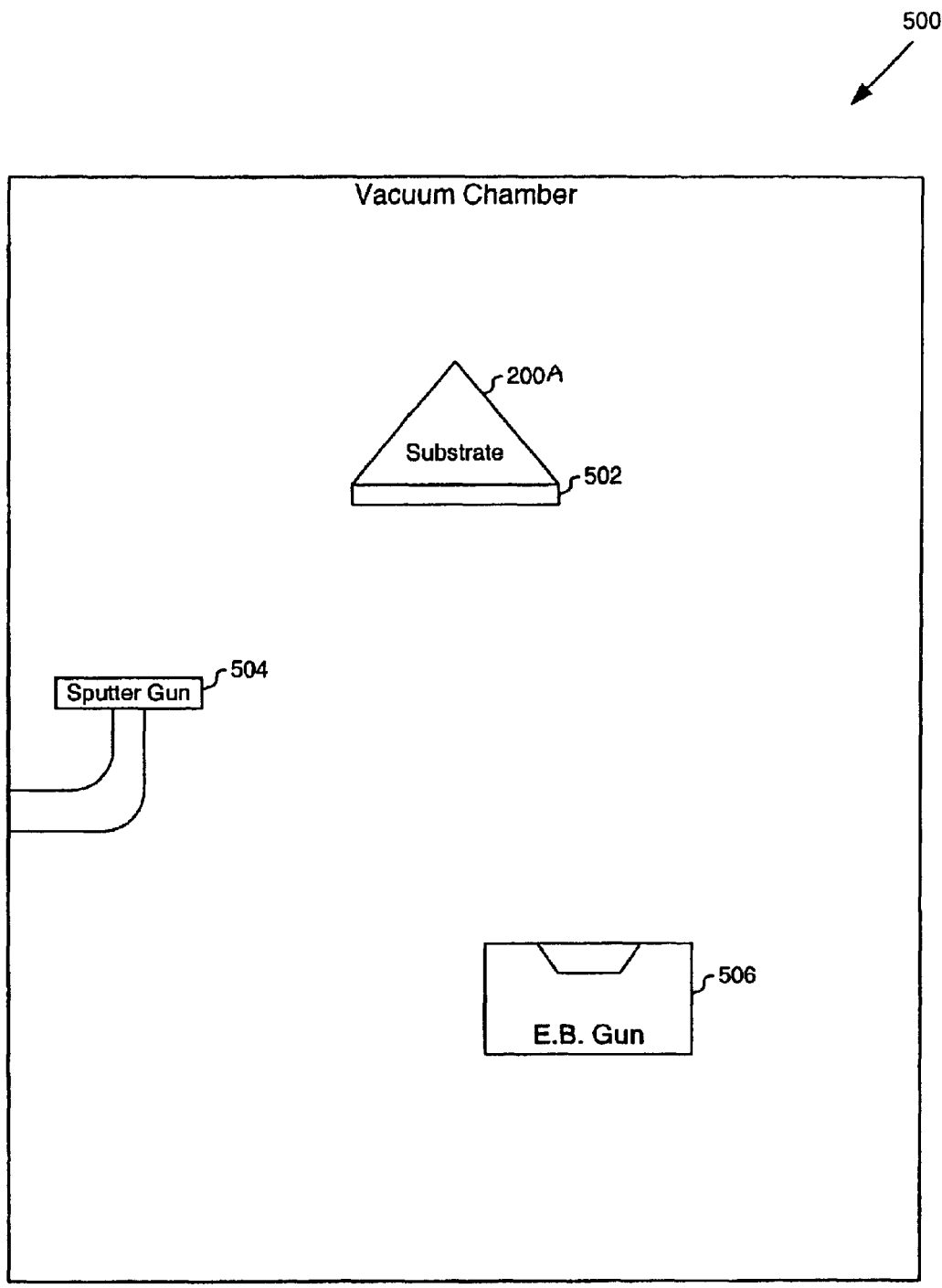
FIG. 5 shows an exemplary vacuum chamber used during part of a process that forms a cube according to embodiments of the present invention.

Now turning to FIG. 5, a vacuum chamber 500 according to an embodiment of the present invention is shown. The vacuum chamber 500 includes a coating nest 502 that holds the prism 200 during deposition operations. In various embodiments, either a sputter device 504 (e.g., sputter gun) or a electron beam device 506 (e.g., electron beam gun), or both can be used to deposit materials that form the dielectric stack 400 and the contacting layer 408 on the coated prism 200A. It is to be appreciated, other deposition devices can be used to form the cube 102.

Figure 6:
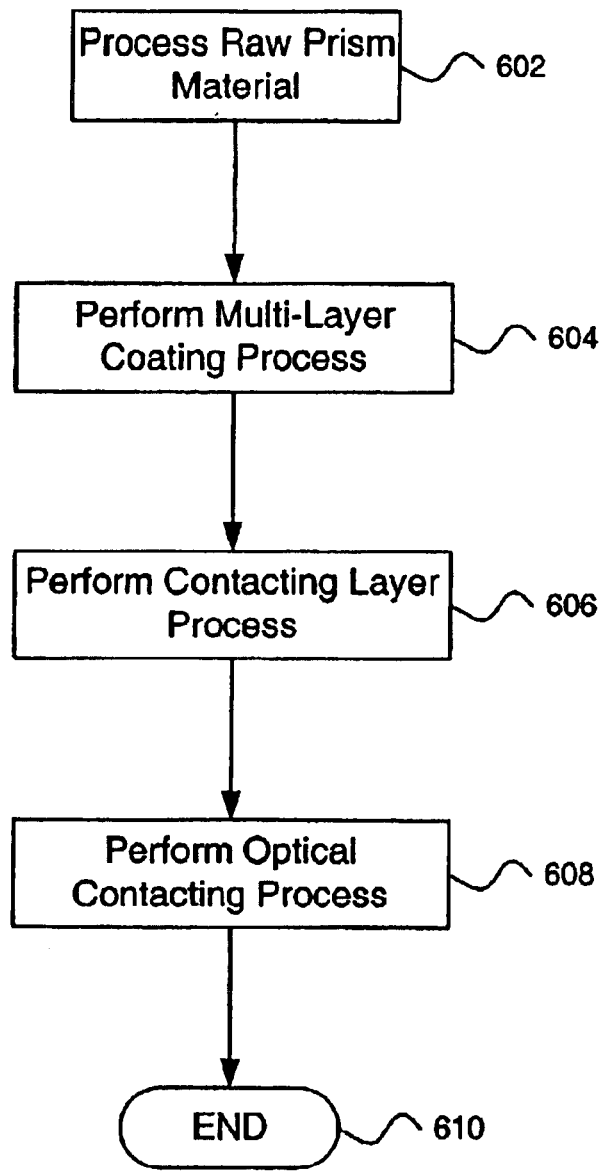
FIG. 6 shows a flow chart depicting method steps for a process used to form a cube according to embodiments of the present invention.

FIG. 6 shows a method 600 for forming the cube 102 according to embodiments of the present invention. At step 602, the prisms 200A–B, which are received from a manufacturer in raw material form, are processed. At step 604, a multi-layer coating process is performed to build the dielectric stack 400 on the main body 402 of the coated prism 200A. At step 606, a contact layer coating process is performed that deposits a contact layer 408 on the dielectric stack 400. At step 608, an optical contacting process is performed that couples the coated prism 200A to the uncoated prism 200B. The method 600 ends at step 610.

Figure 7:
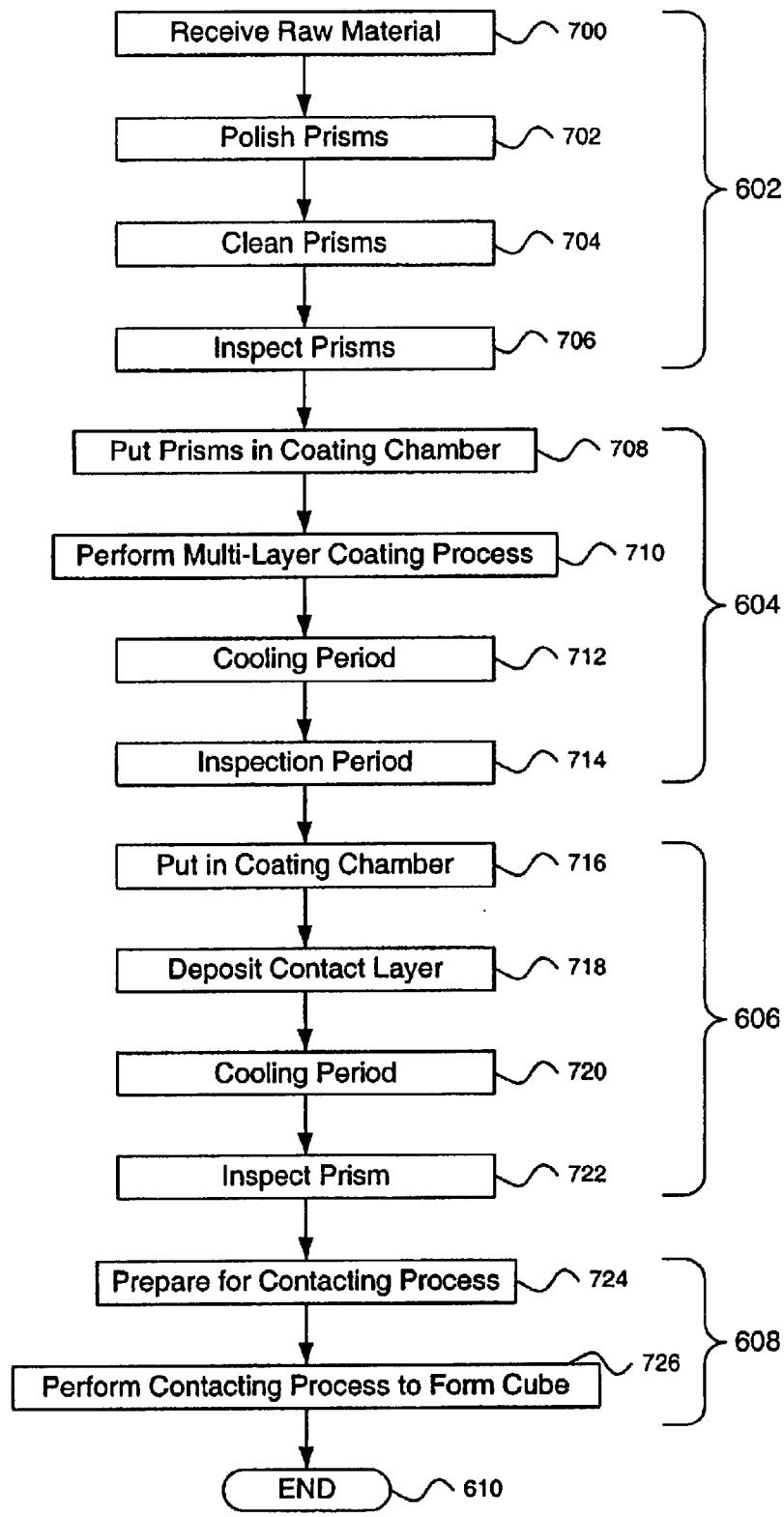
FIG. 7 shows a more detailed flow chart depicting method steps used during the process of FIG. 6.

FIG. 7 shows more detailed method steps for method 600 according to embodiments of the present invention. During the processing step 602, the prisms 200A–B are receive in as raw material at step 700. At step 702, the prisms 200A–B are polished until they conform to end-user specified parameters (e.g., wavelength, dimensions, etc.). The prisms 200A–B are cleaned at step 704 and inspected at step 706 to ensure they meet the end-user specifications.

During the multi-layer coating process 604, the prism 200A that will become a coated prism is placed in the vacuum chamber 500 at step 708. A multi-layer coating process is performed at step 710. During this process alternating deposition of a layer of high index of refraction material 404 and a layer of low index of refraction material 406 forms the dielectric stack 400. The deposition process can be performed by electron beam evaporation, ion beam sputtering, resistance source evaporation, or any other known deposition method. The coated prism 200A is cooled at step 712 and inspected at step 714.

During the contact layer forming process 606, the coated prism 200A is again placed in the vacuum chamber 500 at step 716. A contacting layer 408 (e.g., a fused silica or $SiO_2$ layer) is deposited at step 718. The specific process used to deposit the contacting layer 408 is chosen based on the end use of the cube 102. In embodiments when an end-user's system will be using light in the 157 nm range, the contact layer 408 is deposited with a magnetron sputtering process or an ion beam sputtering process. This ensures there will be high throughput of 157 nm light through the cube 102, (i.e., there will be very little absorption of 157 nm light through the cube 102). If throughput is not a concern for the end-user, then other deposition methods (e.g., electron beam evaporation or resistive source evaporation) can be used. In embodiments when an end-user's system will be using light in the 193 nm range, the contact layer 408 will be deposited with an electron beam evaporation process for good throughput of 193 nm light. Again, where throughput is not a concern, any deposition process can be used. The coated prism 200A is cooled at step 720 and inspected at step 722.

In alternative embodiments, coated prism 200A can remain in vacuum chamber 500 after multi-layer coating process 604. In these embodiments, contact layer forming process 606 can be immediately performed without any intervening steps.

During the contacting process 608, the prisms 200A–B are prepared (e.g., cleaned and positioned) at step 724. At step 726, the prisms 200A–B are optically contacted to securely bond surfaces 300 and 302 together. In some embodiments this is accomplished through glass-to-glass bonding. In other embodiments, other bonding techniques can be used.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method comprising:

(a) forming a multi-layer coating on a prism;

(b) forming a fused silica coating on the multi-layer coating as a contact layer; and (c) coupling the prism to an uncoated prism.

2. The method of claim 1, wherein step (b) further comprises sputtering the fused silica onto the multi-layer coating.

3. The method of claim 2, wherein said sputtering comprises a magnetron sputtering process.

4. The method of claim 2, wherein said sputtering comprises an ion beam sputtering process.

5. The method of claim 1, wherein step (b) further comprises evaporating the fused silica onto the multi-layer coating.

6. The method of claim 5, wherein said evaporating comprises an electron beam evaporation process.

7. The method of claim 1, wherein step (c) further comprises a glass-to-glass bonding process.

8. The method of claim 1, further comprising using a calcium fluoride prism for at least one of the prism and the uncoated prism.

* * * * *